Feb. 4, 1947.  F. H. LEAVITT  2,415,251
SOIL TREATING PROCESS
Filed Feb. 11, 1944  2 Sheets-Sheet 1

Inventor: Floyd H. Leavitt
By his Attorney:

Feb. 4, 1947.                F. H. LEAVITT                2,415,251
                          SOIL TREATING PROCESS
                          Filed Feb. 11, 1944                2 Sheets-Sheet 2

Inventor: Floyd H. Leavitt
By his Attorney:

Patented Feb. 4, 1947

2,415,251

UNITED STATES PATENT OFFICE 2,415,251

SOIL TREATING PROCESS

Floyd H. Leavitt, Burlingame, Calif., assignor to Shell Development Company, San Francisco, Calif., a corporation of Delaware Application February 11, 1944, Serial No. 522,202

10 Claims. (Cl. 47—58)

The present invention relates to soil treating methods and pertains more particularly to an improved method of distributing fumigants, disinfectants and fertilizers throughout soils.

Heretofore, fumigants for controlling harmful soil organisms have been introduced into the soil in various ways, such as by pouring a measured amount of the treating agents into spaced holes, flowing the agents out of pipes attached behind cultivator shoes, spraying the soil surface in combination with subsequent disking or harrowing, etc. All of these prior methods are unsatisfactory for one or more of the following reasons: insufficient distribution and penetration throughout the soil, high evaporation losses which increase the amount of agent necessarily used and thereby the expense of treating, high cost of treating due to the many manipulative and laborious steps involved in applying the agents, long periods necessary for efficiently treating, etc.

It is especially important in the case of soil fumigants that a wide distribution and deep penetration throughout the soil be obtained in order to control harmful soil organisms, such as nematodes, root-rotting fungi, Sclerotium rolfsii, southern root rot, oak root fungus in peach and citrus trees, wire worms, etc. The nematode or eelworm is a particularly troublesome soil pest and is widely distributed in soils throughout the world. Its many species attack almost all plants and trees including most food crops. For example, one species, Heterodera marioni, which is distributed throughout the temperate, subtropical and tropical regions of the world, attacks more than 800 plants. The attacks by nematodes weaken plants and cause them to become diseased. However, in spite of considerable effort and research, no satisfactory control of nematodes has heretofore been widely used. Although highly toxic soil fumigants may have been developed, the lack of success in controlling nematodes and the like is due at least in part to the poor distribution and penetration of the agents through the soil.

It is therefore an object of this invention to provide an improved method of distributing fumigants, disinfectants, fertilizers and the like throughout soils.

It is another object of this invention to provide an apparatus for carrying out the present method.

The accompanying drawings illustrate a preferred embodiment of an apparatus for carrying out the present invention.

Figure 1:
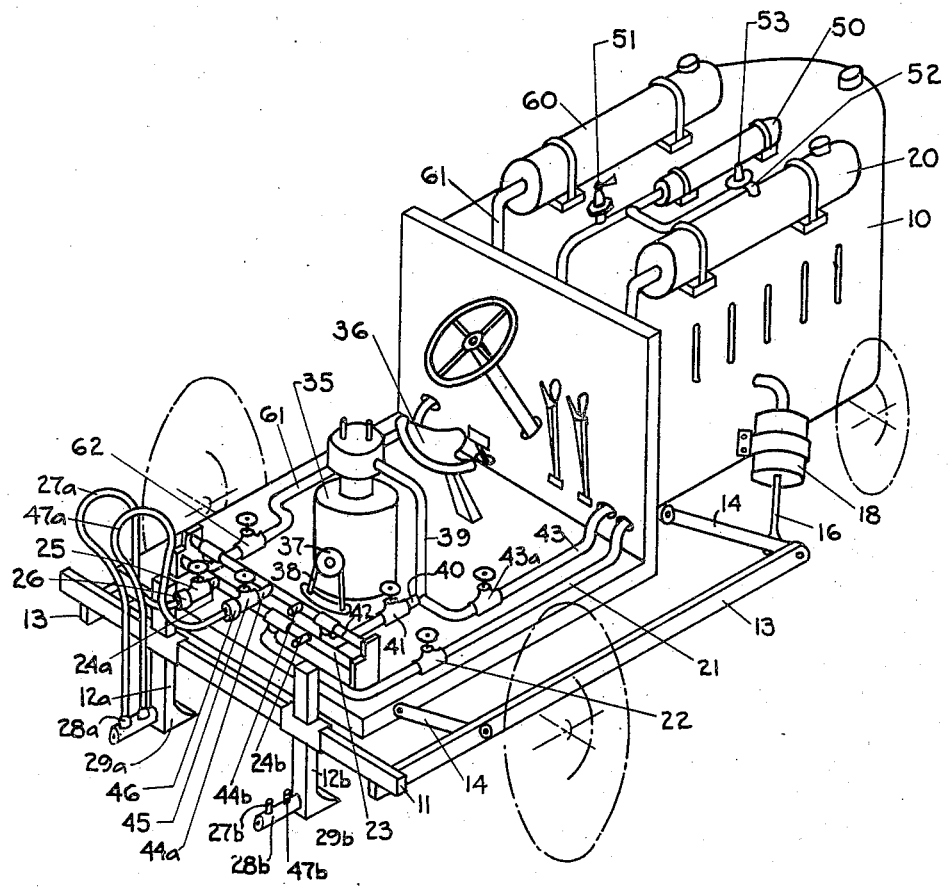
Figure 1 illustrates in perspective view a subsurface liquid atomizing machine.
Figure 2:
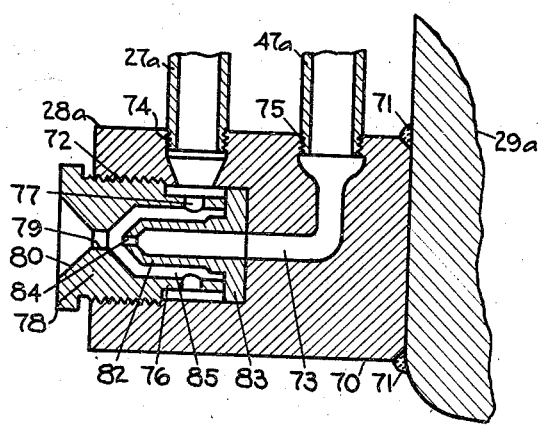
Figure 2 illustrates in vertical cross-section a preferred embodiment of the atomizing nozzle of said atomizing machine.
Figure 3:
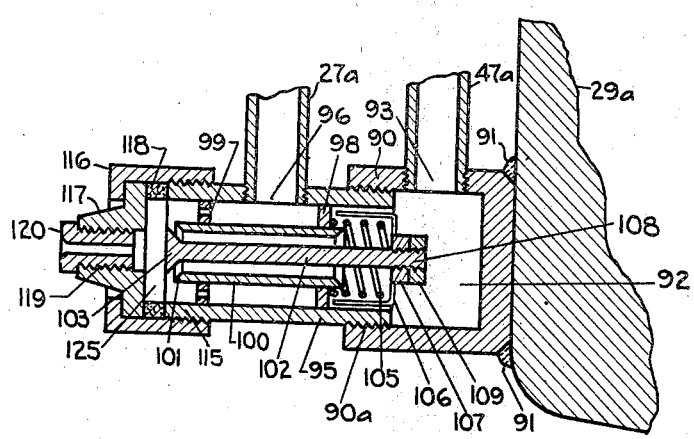
Figure 3 illustrates in vertical cross-section another embodiment of an atomizing nozzle.

The method of the present invention briefly comprises atomizing under the soil surface a liquid soil treating agent with a gas. The method is especially applicable to the distribution of fumigants throughout the soil in order to control harmful soil organisms such as nematodes.

Although many soil fumigating agents may be used to some advantage in the present process, it is preferred to use halogenated, especially polyhalogenated, unsaturated lower hydrocarbons, particularly those of 3 to 6 carbon atoms. A highly effective group of agents are the allyl-vinyl type polyhalo, preferably dihalo, unsaturated hydrocarbons of 3 to 6 carbon atoms, particularly those of 3 carbon atoms. In this class, it is preferably that one of the halo groups be on a terminal carbon atom. An especially effective compound of this class is 1,3-dichloropropene-1. A highly useful mixture containing 55% to 75% of this compound along with 15% to 40% of 1,2-dichloropropane and 0% to 20% of higher boiling materials consisting mainly of trichloro- and tetra-chloropropane may be obtained as a by-product from the high temperature chlorsubstitution of propylene in the manufacture of allyl chloride under certain conditions. Other preferred agents include 1,1-dihalopropene-2 and the 2-alkyl homologues thereof, wherein the alkyl substituent has 1 to 3 carbon atoms, e. g. 1,1-dichloropropene-2, 1,1-dichloro-2-methylpropene-2, etc., and diallyl type polyhalo, preferably dihalo, unsaturated hydrocarbons of 4 carbon atoms which have the halo groups on different carbon atoms, e. g. 1,4-dichlorobutene-2 and 1-chloro-2-chloromethylpropene-2. Generally most effective are the compounds or mixtures thereof which have a boiling range of 75° C. to 150° C.

Other halogenated organic compounds, preferably having less than 20 carbon atoms, are also suitable. There may be mentioned, for example, halogenated carboxylic acids, halogenated esters of carboxylic acids, halogenated ketones, substituted derivatives thereof, and the like. The halogenated compounds of this type having less than 8 carbon atoms are preferred. The halogenated organic compounds described above may, in some cases, contain other substituents, such as hydroxy, thiocyano, nitro, amino, imino, carbonyl, ether, thioether, mercapto, etc.

It is usually preferable to add small amounts of stabilizers to such halogenated organic compounds. Suitable stabilizers include hydrochloride-acceptors and the like, such as, for example, epichlorhydrin, propylene oxide, ethylene oxide, methyl vinyl ketone, acrolein, amyl amine, dimethyl amine, ammonia, ethanol amine, dihydroisophoronyl amine, glycerol, lime water, etc.

While the halogenated compounds are preferred soil fumigants, other soil treating agents, such as phosphoric acid, etc., may be used in the general method of the present invention.

Suitable gases or vaporous materials which may be utilized for atomizing the liquid soil treating agents include ammonia, nitrogen, hydrocarbon gases or their halogenated derivatives or mixtures thereof such as methane, ethane, ethylene, propane, propane-propylene and butane-butylene fractions of petroleum, dichlorodifluoromethane, dichlorotetrafluoroethane, and the like. The term "vaporous materials" is intended to include both normally gaseous materials as well as materials having a sufficiently high vapor pressure to be at least partially vaporized at the temperature of application. Thus, for example, partially vaporized liquid anhydrous ammonia or the like may be used. However, it is preferable that the atomizing agent is mainly in the vaporized state when it reaches the atomizing nozzle. The atomizing gas need not be completely inert to the liquid soil treating agent but only relatively inert. For example, the above mentioned chlorinated $C_3$ mixture, containing 1,3-dichloropropane, 1,2-dichloropropane and some trichloropropenes and propanes have been found to be effectively atomized with ammonia gas. This combination of atomizing halogenated unsaturated lower hydrocarbons with ammonia is particularly desirable since the harmful soil organisms such as nematodes are effectively eradicated while at the same time a quickly-assimilatable nitrogen-containing fertilizer is being introduced into the soil. The injection of anhydrous ammonia alone into soil is disclosed in prior Leavitt U. S. Patents 2,285,932 and 2,306,339.

The quantities of the liquid soil treating agents and atomizing gas depend upon the nature of the materials used, the general condition of the soil, the time of application, etc., and, in the case of ammonia, on the nature of the crop. For example, when using the above-mentioned mixture containing 1,3-dichloropropene-1 and 1,2-dichloropropane as the fumigating agent, an application rate of 75 to 400 pounds per acre and preferably from 100 to 250 pounds per acre is used. When using agents, such as 1,3-dichloropropene-1 in relatively pure form, lesser amounts, such as 50 to 200 pounds per acre, of the fumigating agent are preferred. When using ammonia as the atomizing gas, excellent results are obtained by using 20 to 150 pounds of ammonia per acre, the lesser amounts being used with grain crops and the heavier amounts being used with vegetables.

Particularly effective results, including high kill of nematodes and use of a minimum amount of soil fumigant, are obtained when the atomization is effected at least 2 inches, and preferably 3 to 8 inches, below the soil surface. Greater depths may be used, if desired, the proper depth depending on the nature of the soil, its physical texture or looseness, etc.

The atomization of the liquid soil treating agents with gaseous materials is preferably performed by means of an atomizing nozzle carried underground behind a cultivator shoe or other suitable ground working tool. The liquid soil treating agent, preferably under a positive pressure, and the gaseous atomizing agent are separately conducted to the atomizing nozzle by means of pipes leading from supply sources of the two materials.

Referring to Fig. 1 of the drawings, a preferred embodiment of an apparatus for carrying out the present method comprises a wheeled farm tractor 10 having a suitable tool bar 11 or the like, which preferably may be raised or lowered for manipulation of ground-working tools, such as cultivator blades 12a and 12b, carried by said tool or gang bar 11. The mechanism for raising and lowering the tool bar 11 comprises a pair of horizontal bars 13 hung from the chassis of the tractor 10 by means of pivoted pendants 14. Horizontal bars 13, upon the rear ends of which are attached the tool bar 11, are swung backwards and downwards or forwards and upwards by means of a piston rod 16 which is actuated by a hydraulic piston adapted to reciprocate by hydraulic pressure in cylinder 18 or any other suitable actuating means.

A cylinder 20 of liquid soil treating agent, such as the hereinabove mentioned halogenated compounds, is suitably supported above the engine hood of the tractor 10. A conduit 21 leads from the fumigant cylinder 20 through shut-off valve 22 to manifold 23. Outlets 24a and 24b in spaced position on said fumigant manifold 23 are provided for each cultivator 12a and 12b. Connected to outlet 24a is a shut-off valve 25, which is provided with an interchangeable flow-control orifice 26 or other suitable flow-controlling device. (A similar shut-off valve and flow-control orifice is provided for outlet 24b, but is not shown for purposes of clarity in the drawings.) Leading from said orifice 26 is a flexible conduit 27a which passes down the rear of the cultivator blade 12a. A similar flexible conduit 27b passes down the rear of blade 12b. The conduits 27a and 27b lead to atomizing nozzles 28a and 28b, respectively, rigidly mounted behind the cultivator shoes 29a and 29b which form the lower end of the cultivator blades 12a and 12b, respectively.

In case air is used as the atomizing gas, an air compressor 35 may be mounted on the tractor floor behind the driver's seat 36. The air compressor 35 may use a power take-off from the tractor drive-shaft by means of a pulley 37 on the compressor 35 and a belt 38. From the air compressor 35 a conduit 39 leads to a Y, one branch 40 of which leads through valve 41 to atomizing gas manifold 42, and the other branch 43, including control valve 43a, leads to the positive-pressure system, as described hereinbelow. The atomizing gas manifold 42 is provided with spaced outlets 44a and 44b. Outlet 44a is provided with valve 45 and flow-controlling means, such as a replaceable orifice 46. Likewise, but not shown, outlet 44b is provided with a valve and orifice. Leading from said orifice 46 is a flexible conduit 47a which passes down the rear of the cultivator blade 12a to the atomizing nozzle. A similar flexible conduit 47b passes down the rear of cultivator blade 12b. The air compressor 35 may be adjusted to give an air pressure of about 30 pounds per sq. in., although higher or lower pressures may be used.

The conduit branch 43 leads to an air receiver 50 mounted over the tractor engine hood. Contained in said conduit branch 43 is a safety or relief valve 51, which may be suitably set at 50 lbs. per sq. in. The relief pressure, may, however, be set lower or higher, such as 10 to 75 lbs. per sq. in., depending on the nature of the liquid treating agent, the diameter of the conduits, etc. Leading from conduit branch 43 is a conduit 52, which is provided with a pressure regulating valve 53 and opens into the top of the supply cylinder 20 for the liquid soil treating agent. When using the halogenated unsaturated lower hydrocarbons, the pressure regulating valve may be set at about 20 pounds per sq. in., although higher or lower pressures may be used, depending on conditions, as desired.

In case a compressed atomizing agent, such as ammonia, is used as the atomizing gas, another cylinder 60 is suitably mounted over the tractor engine hood. From the ammonia cylinder 60 a conduit 61 leads through valve 62 to the atomizing gas manifold 42. Naturally when using ammonia, valve 62 is open and the air control valve 41 is closed. Likewise, when using air, said valves 62 and 41 are in the opposite position.

Referring to Figure 2, showing a preferred nozzle in detail, the nozzle 28a (and similarly nozzle 28b) comprises a nozzle body 70 which is fastened, such as by welding as indicated at 71, to the rear of the cultivator shoe 29a. Into the rear of the nozzle body 70 is a large, horizontal, and at least partially threaded bore 72. Extending from said large bore 72 into the nozzle body 70 is a smaller bore 73. Extending from the upper face of the nozzle body 70 through to the large bore 72 is a threaded bore 74, into which is screwed the end of the conduit 27a for the liquid soil treating agent. Another threaded bore 75 extends from the upper face of the nozzle body 70 to the inner end of the narrow horizontal bore 73. The upper threaded portion of the bore 75 is adapted to receive the atomizing gas conduit 47a and the lower portion of the bore 75 may be constricted to approximately the size of the narrow horizontal bore 73.

Threaded into the large horizontal bore 72 is an outer nozzle sleeve 76 having perforations 77 in the annulus opposite the vertical bore 74. The bore through the sleeve 76 is constricted at 78 in the outer end to form a nozzle outlet 79 with outwardly tapered faces 80. A gas conducting sleeve 82 is held within the outer nozzle sleeve 76 by the action of the inner end of the outer sleeve 76 against the flange 83 on the inner end of inner sleeve 82. The outer end of the gas-conducting sleeve 82 is constricted to form a small port 84 spaced from said orifice outlet 79. Gas passing through the inner sleeve 82 and port 84 and liquid flowing through perforations 77 from conduit 27a into the annular space 85 between the two sleeves 76 and 82 causes atomization to take place between the inner sleeve port 84 and outer sleeve outlet 79.

In one experiment using air, the flow-controlling orifices (e. g., 26 and 46) were selected to give 2½ cubic feet per minute of air at 25 pounds per sq. in. and 55 pounds per hour of said propene-propane dichlorides mixture. At normal tractor speeds with cultivator blades 12a and 12b spaced 18 inches apart, this yields about 90 pounds per acre of said propene-propane dichlorides mixture. By using the same air flow rate and blade spacing but with larger orifices, the flow of the chlorinated propene-propane mixture was increased to about 675 cc. per minute to give a treatment of about 200 pounds per acre of said mixture at a tractor speed of 260 feet per minute.

In another experiment, ammonia gas was used at the rate of 11 cu. ft. of partially vaporized ammonia per minute. At normal tractor speeds and 18 inch spacing of the cultivator blades 12a and 12b, this rate is equivalent to about 50 pounds per acre of ammonia. This rate of ammonia was also effectively used with flow rates for said propene-propane dichlorides mixture to yield 90 and 300 pounds per acre of the dichloride mixture.

It will be readily apparent that various modifications and additions may be made in the above-described preferred embodiment of suitable apparatus for carrying out the present method without departing from the spirit of the present invention. For example, it is obvious that more than two cultivator injection blades 12a and 12b may be used. Thus, while only two are shown for simplicity, usually four and sometimes six of such blades are used. Likewise, instead of mounting the supply cylinders 20 and 60 or other suitable tanks over the engine hood, they may be arranged in other positions, such as, for example, on a trailer drawn by the tractor. Further, if desired, the whole of the injection apparatus, including the supply cylinders 20 and 60, the air compressor 35 (when used) and the cultivator blades 12a and 12b, may be suitably mounted on a trailer or other suitable farm equipment.

In some cases, it is desirable to provide a nozzle having a pressure-responsive valve which closes when the supply of fumigant to the nozzle is shut off, whereby liquid fumigant in the conduit leading to the nozzle will not drain out after the fumigant supply control valve 22 or the like is closed. Referring to Fig. 3, a preferred embodiment of a nozzle of this type comprises a cylindrical member 90, which is attached, such as by welding as indicated at 91, to the rear of the cultivator shoe 29a. Within the cylindrical member is a fumigant receiving chamber 92, to which fumigant is displaced through threaded port 93 in the upper portion of said member 90 and conduit 47a threadably fastened in said port 93.

To the rearward threaded end 90a of the cylindrical member 90 is attached a nipple member 95 having a threaded port 96 in its upper portion, to which port 96 is threadably attached the atomizing gas conduit 27a. Positioned within the nipple member 95 by means of a forward partition plate 98 and rearward perforated partition plate 99 is a fumigant conducting tube 100 having a valve seat 101 formed at its rearward end. Extending through the tube 100 is a valve stem 102 carrying a valve 103 cooperating with the valve seat 101 to control the flow through the tube 100. Under no-pressure conditions the valve is held closed by means of a coil spring 105 surrounding the forward end of the tube 100 and acting against the partition plate 98 and a spring retaining spider 106 fastened to a threaded nut 107 carried on the forward threaded end 108 of the valve stem 102. The nut 107 carrying the spider 106 is adapted to be held at the desired position on the valve stem 102 by means of a lock nut 109. By adjusting the position of the nut 107 the spacing between the ends of the spider 106 and the partition plate 98 is determined, whereby the amount of maximum opening of the valve 103 is regulated.

To the rearward threaded end 115 of the nipple member 95 is threadably attached a clamp member 116, which holds a tubular flanged head member 117 against the gasket 118 or packing means between said head member 117 and the end 115 of the nipple member 95. Threaded into the threaded bore 119 of the head member 117 is a suitable tubular nozzle tip 120.

In operation, the pressure of the spring 105 is insufficient to hold the valve 103 in closed positions on the valve seat 101 against the pressure of the liquid fumigant entering the tube 100 from the chamber 92 and supply conduit 47a. Atomizing gas, such as air, entering through supply conduit 27a, passes through the perforated partition plate 99 to the atomizing chamber 125, where atomization of the liquid fumigant issuing from tube 100 takes place. Thereafter the atomized mixture passes out through the tubular nozzle tip 120.

When the pressure flow of liquid fumigant to the nozzle is stopped, such as by closing valve 22 (Fig. 1), the action of the spring 105 against the retaining spider causes the valve 103 to be closed against the valve seat 101 and to prevent further fumigant from entering the atomizing chamber 125. This avoids dripping of liquid fumigant when the end of a crop row is reached or at any other time that it may be desired to temporarily stop the machine or flow of liquid fumigant. Also, back-flow of atomizing gas into the liquid fumigant conduits or supply tanks is avoided, since, when the liquid fumigant flow is stopped, the pressure of the atomizing gas in the atomizing chamber 125 acts, in addition to spring 105, to close valve 103.

The above described apparatus is claimed in copending divisional application, Serial No. 552,525, filed September 2, 1944.

I claim as my invention:

1. The improved method of controlling harmful soil organisms comprising atomizing below the soil surface and in the vicinity of said organisms a liquid soil fumigant by means of a vaporous ammonia-containing plant food, said latter serving as the atomizing agent.

2. The improved method of controlling harmful soil organisms comprising atomizing below the soil surface and in the vicinity of said organisms a liquid soil fumigant with a gaseous ammonia, said gaseous ammonia serving as the atomizing agent.

3. The improved method of controlling harmful soil organisms comprising atomizing below the soil surface and in the vicinity of said organisms a liquid soil fumigant by means of anhydrous ammonia, said latter serving as the atomizing agent.

4. The improved method of controlling harmful soil organisms comprising introducing below the soil surface and in the vicinity of said organisms a halogenated organic compound selected from the group consisting of halogenated unsaturated lower hydrocarbons, halogenated carboxylic acids, halogenated esters of carboxylic acids, halogenated ketones, and the substituted derivatives thereof, by means of a vaporous plant stimulant, said latter serving as an atomizing agent.

5. The improved method of controlling harmful soil organisms comprising atomizing a liquid soil fumigant by means of a vaporous ammonia-containing plant food, said latter serving as the atomizing agent at a depth of at least 2 inches below the soil surface.

6. The method of claim 4 wherein the vaporous plant stimulant comprises a vaporous ammonia-containing plant food.

7. The method of claim 4 wherein the vaporous plant stimulant comprises gaseous ammonia.

8. A method of treating soils to stimulate plant growth therein, which comprises introducing a halogenated organic soil fumigant containing reactive halogen atoms by means of a vaporous plant stimulant, the latter serving as an atomizing agent.

9. A method of treating soils containing harmful soil organisms, which comprises introducing a liquid soil fumigating agent into and below the surface of the soil by means of a vaporous plant stimulant, the latter serving as an atomizing agent.

10. A method of treating soils containing harmful soil organisms, which comprises introducing a soil treating agent into and below the surface of the soil by means of a vaporous dissimilar plant stimulant, the latter serving as an atomizing agent.

FLOYD H. LEAVITT.

REFERENCES CITED

The following references are of record in the file of this patent:

UNITED STATES PATENTS

| Number | Name | Date |
|---|---|---|
| 1,814,446 | Irish | July 14, 1931 |
| 2,285,932 | Leavitt | June 9, 1942 |
| 1,038,084 | Carroll | Sept. 10, 1912 |
| 1,667,923 | Bishop | May 1, 1928 |
| 317,802 | Laborde | May 12, 1885 |

FOREIGN PATENTS

| Number | Country | Date |
|---|---|---|
| 843,895 | French | Apr. 3, 1939 |

OTHER REFERENCES

Lehman, "Laboratory Tests of Organic Fumigants for Wireworms" published 1942 in Journal of Economic Entomology, vol. 35, pages 659 through 661, copy in Div. 63.